(12) United States Patent
Yoo (10) Patent No.: US 8,723,461 B2
(45) Date of Patent: May 13, 2014

(54) APPARATUS FOR OPERATING INTERIOR PERMANENT MAGNET SYNCHRONOUS MOTOR

(75) Inventor: Anno Yoo, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 196 days.

(21) Appl. No.: 13/542,428

(22) Filed: Jul. 5, 2012

(65) Prior Publication Data

US 2013/0009574 A1 Jan. 10, 2013

(30) Foreign Application Priority Data

Jul. 5, 2011 (KR) ........................ 10-2011-0066622

(51) Int. Cl.
*H02P 21/00* (2006.01)

(52) U.S. Cl.
USPC ................. 318/400.02; 318/434; 318/400.12; 318/635; 318/400.07; 361/93.9

(58) Field of Classification Search
CPC ... H02P 21/0035; H02P 21/06; H02P 21/146; H02P 2207/05; H02P 6/085; H02P 6/14; H02P 6/06; H02P 6/10; H02P 23/0077; H02P 29/02; H02P 27/08; H02P 6/18; Y02T 10/643; Y02T 10/642; Y02T 10/7005; B62D 5/0463; B62D 5/046; B60W 10/08; G05B 5/01; G05B 2219/42237; G05D 3/1427; G05D 1/0206; G05D 1/0808; H02M 7/53873; H02M 7/53875; G08C 19/48; H03M 1/00; H03M 2201/01; H03M 2201/4125; H03M 2201/4233; G01C 17/30; B60L 2220/14; B60L 15/025
USPC ........ 318/400.02, 400.06, 472.812, 490, 727, 318/767, 800, 805, 400.22, 504, 446, 434, 318/722, 400.11, 400.21, 432, 530, 714, 318/400.23, 537, 719, 139, 400.15, 802, 318/811, 400.17, 400.07, 430; 180/54.1, 180/65.1, 65.21, 65.275, 65.285, 65.265; 377/16; 361/965
See application file for complete search history.

(56) References Cited

U.S. PATENT DOCUMENTS 5,777,447 A * 7/1998 Okano .......................... 318/434
2008/0303475 A1 * 12/2008 Patel et al. ..................... 318/634

(Continued)

FOREIGN PATENT DOCUMENTS

JP 2010279176 12/2010
JP 2010279176 A * 12/2010

(Continued)

OTHER PUBLICATIONS

Japan Patent Office Application Serial No. 2012-150429, Office Action dated Oct. 1, 2013, 3 pages.

*Primary Examiner* — Shawki S Ismail
*Assistant Examiner* — Jorge L Carrasquillo
(74) *Attorney, Agent, or Firm* — Lee, Hong, Degerman, Kang & Waimey (57) ABSTRACT

Provided is an apparatus for operating interior permanent magnet synchronous motor in a system including a detector measuring a position and a speed of a rotor of an IPMSM, the apparatus including an output unit generating and outputting a current command driving a MTPA (Maximum Torque Per Ampere) based on the command torque, a correction unit correcting the current command outputted by the output unit, a feedback unit transmitting over-modulated voltage information to the correction unit, a control unit controlling the current command to output a voltage, a first limit unit limiting an output of the control unit using a maximum voltage synthesizable by an inverter unit, and the inverter unit applying a 3-phase voltage command for tracking a command torque to the IPMSM using an output of the first limit unit.

10 Claims, 7 Drawing Sheets

(56) References Cited

U.S. PATENT DOCUMENTS

2009/0212734 A1* 8/2009 Royak et al. .................. 318/801
2012/0217923 A1* 8/2012 Wu et al. ....................... 318/610

FOREIGN PATENT DOCUMENTS

| JP | 2011125134 | | 6/2011 |
|----|------------|---|--------|
| JP | 2011125134 | A * | 6/2011 |

* cited by examiner

APPARATUS FOR OPERATING INTERIOR PERMANENT MAGNET SYNCHRONOUS MOTOR

Pursuant to 35 U.S.C. §119 (a), this application claims the benefit of earlier filing date and right of priority to Korean Patent Application No. 10-2011-0066622, filed on Jul. 5, 2011 content of which is hereby incorporated by reference in their entirety.

BACKGROUND OF THE DISCLOSURE

1. Field of Endeavor

The present disclosure relates to a motor driving apparatus, and more particularly to a driving apparatus for operating an interior permanent magnet synchronous motor at a speed higher than a rated speed.

2. Background

The information disclosed in this Background of the Invention section is only for enhancement of understanding of the background of the invention and should not be taken as an acknowledgement or any form of suggestion that this information forms the prior art that is already known to a person skilled in the art.

A permanent magnet synchronous motor (PMSM) driven by a voltage inverter operates at a speed control mode or a torque control mode. The speed control mode serves to drive a hoist load such as an elevator or a crane, or a variable speed load such as a fan or a pump, and the torque control mode functions to drive a traction motor of an electric vehicle.

Generally, an output of a speed controller is provided in a torque command under a speed control mode, and a speed control mode of a permanent magnet synchronous motor (PMSM) includes a torque control mode. As a result, all the speed control mode and torque control mode obtain a current command from the torque command and perform a current control, whereby the PMSM is controlled.

The voltage inverter performs a current control under a limited DC-linked voltage and a limited current condition to track a torque command. However, there is a problem in tracking a torque command due to the limited DC-link voltage and limited current condition, in a case a high speed driving of the PMSM is needed.

Figure 1:
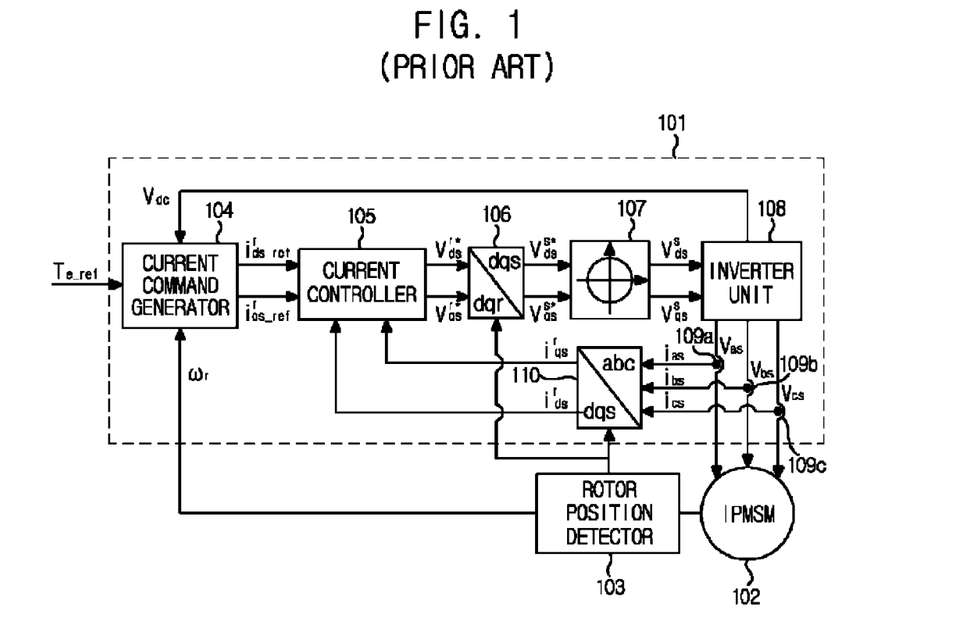
FIG. 1 is a schematic block diagram illustrating an operating system of an IPMSM according to prior art.

FIG. 1 is a block diagram illustrating a driving system of an interior permanent magnet synchronous motor according to prior art, where the system is driven by an inverter embodied by a vector control independently controlling a flux current and a torque current from an instruction torque.

The conventional driving system includes an inverter (101), an IPMSM (102) and a rotor position detector (103) attached to a rotor of the IPMSM.

The inverter (101) receives a command torque to output voltages (Vas, Vbs, Vcs) capable of being driven by the command torque, and the rotor position detector (103) calculates or measures a rotor position or a rotor speed.

The rotor position calculated or measured by the rotor position detector (103) is used for coordinate change by coordinate converters (106, 110), and the rotor speed is used by a current command generator (104).

The current command generator (104) outputs a current command on a synchronous reference frame in response to the command torque, the rotor speed, and the DC-link voltage of inverter. In case of IPMSM, the current command generator (104) generally uses a 2-D look-up table, where the look-up table outputs d and q-axes current commands on synchronous reference frame relative to an entire driving region.

A current regulator (105) serves to control the current commands obtained from the current command generator (104) to output d and q-axes voltages on the synchronous reference frame.

The coordinate converter (106) uses the rotor position information obtained by the rotor position detector (103) to convert an output voltage of a current controller (105) to a voltage on a stationary reference frame.

A voltage limiter (107) uses an inscribed circle of a voltage limit hexagon to convert a voltage of the coordinate converter (106) to a voltage synthesizable by an inverter unit (108). The voltage limit condition of the voltage limiter (107) is determined by the DC-link voltage, and the voltage positioned at an outside of the inscribed circle of the voltage limit hexagon is prevented from being outputted and stays on the inscribed circle of the voltage limit hexagon.

The inverter unit (108) is a voltage type inverter including a power semiconductor such as an IGBT (Insulated Gate Bipolar Transistor) or a MOSFET (Metal Oxide Semiconductor Field-Effect Transistor), and supplies the voltage commands (Vas, Vbs, Vcs) for following a command torque to the IPMSM (102).

A current sensor (109) is interposed between the IPMSM (102) and the inverter (108) to measure a phase current applied to the IPMSM (102), and the current measured by the current sensor (109) is returned as a feedback to the current command generator (104) and the current controller (105) in response to the coordinate conversion of the coordinate converter (110). Voltage Equations on the synchronous reference frame of IPMSM (102) are provided as below:

$$V_{ds}^r = R_s i_{ds}^r + L_{ds}\frac{d i_{ds}^r}{dt} - \omega_r \lambda_{qs}^r \qquad \text{[Equation 1]}$$

$$V_{qs}^r = R_s i_{qs}^r + L_{qs}\frac{d i_{qs}^r}{dt} - \omega_r \lambda_{ds}^r \qquad \text{[Equation 2]}$$

where, a superscript 'r' represents a variable on synchronous reference frame, a subscript 's' represents a variable of stationary reference frame, '$\omega_r$' represents an angular velocity of rotor, '$i_{ds}^r$' and '$i_{qs}^r$' represent respectively stator d and q-axes currents on the synchronous reference frame, '$V_{ds}^r$' and '$V_{qs}^r$' represent respectively stator d and q-axes voltages on the synchronous reference frame, '$\lambda_{ds}^r$' and '$\lambda_{qs}^r$' represent respectively stator d and q-axes rotor fluxes on the synchronous reference frame, $R_s$, $L_{ds}$ and $L_{qs}$ represent respectively stator resistance d and q-axes inductances.

A driving limit condition of IPMSM (102) is divided to a voltage limit condition and a current limit condition, and expressed as under:

$$(V_{ds}^r)^2 + (V_{qs}^r)^2 \leq (V_{s,max})^2 \qquad \text{[Equation 3]}$$

$$(I_{ds}^r)^2 + (I_{qs}^r)^2 \leq (I_{s,max})^2 \qquad \text{[Equation 4]}$$

where, $V_{s,max}$ defines a size of maximum voltage synthesizable by the inverter (101), and $I_{s,max}$ defines a maximum or rated current of IPMSM (102).

Figure 2:
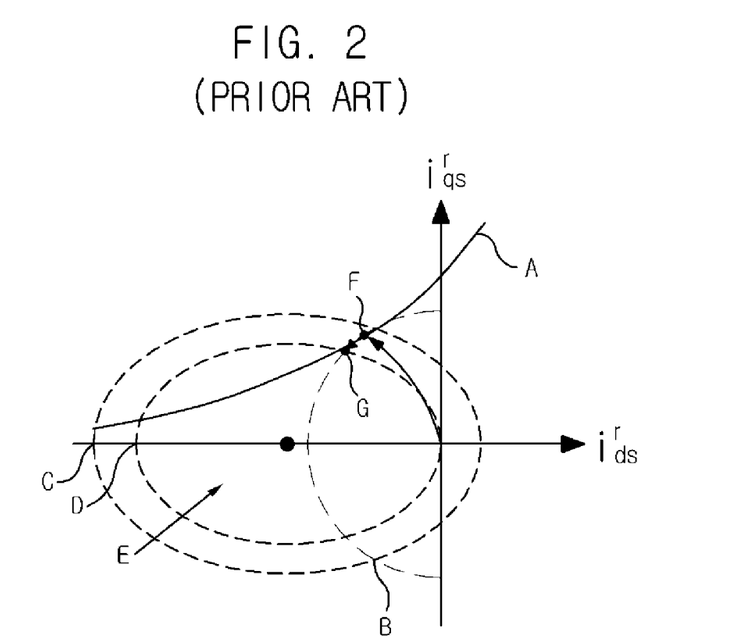
FIG. 2 is an exemplary view illustrating a driving region of a conventional IPMSM on a current region of a synchronous reference frame.

FIG. 2 is an exemplary view illustrating a driving region of the IPMSM of FIG. 1, where A is a curve of a constant torque, and currents on d and q-axes on the synchronous reference frame relative to a constant command torque may have an infinite combination, B is a current limiting condition of inverter as shown in the above Equation 4, and C and D are examples of voltage limit condition in response to rotor speed, as shown in above Equation 3.

The voltage limit condition in the driving region of the IPMSM (102) is changed in response to the rotor speed, where as the rotor speed increases, the size of the voltage limit condition to E direction decreases.

The sizes of d and q-axes currents on the synchronous reference frame controllable by the inverter (101) relative to the constant command torque are determined in a range satisfying both an interior of the current limit condition of B and an interior of the voltage limit condition of C or D. In a case a voltage margin is sufficient, the voltage limit condition is not affected by limiting factors, such that it would be advantageous to track a current command driving a MTPA (Maximum Torque Per Ampere) in terms of efficiency of IPMSM (102).

For example, in case a predetermined torque command of A is given, and a voltage limit condition is given as C, a current command to follow a command torque is determined at F, where F is a driving point for satisfying the MTPA.

However, in a case the rotor speed increases to cause the voltage limit condition to move from C to D, the driving point must move to G capable of maintaining the maximum output torque where F is a current region uncontrollable by the inverter (101). The moving process of current command as described above has a non-linear relationship because an inductance of IPMSM (102) is saturated according to current size.

Therefore, characteristic of IPMSM (102) is measured off-line during driving of the IPMSM (102) to prepare at least two more 2-D look-up tables, and the current command generator (104) of FIG. 1 is made to generate a current command on the synchronous reference frame based on constant torque, driving speed, DC-link voltage. The 2-D look-up table inputs the torque command and flux information to generate d and q-axes current commands on the synchronous reference frame. At this time, the flux information may be obtained by dividing the DC-link voltage by rotor speed.

A feedback current of the current command generator (104) and the coordinate converter (110) of FIG. 1 is inputted to the current limiter (105). The current limiter (105) is a proportional and integral controller to synthesize an output voltage as per the following Equations.

$$V_{ds}^{r*} = \left(K_{pd} + \frac{K_{id}}{s}\right)(i_{ds-ref}^{r} - i_{ds}^{r}) - \omega_r \lambda_{qs}^{r} \quad \text{[Equation 5]}$$

$$V_{qs}^{r*} = \left(K_{pd} + \frac{K_{iq}}{s}\right)(i_{qs-ref}^{r} - i_{qs}^{r}) - \omega_r \lambda_{ds}^{r} \quad \text{[Equation 6]}$$

The coordinate converter (106) converts an output voltage of the current limiter (105) on the synchronous reference frame to a voltage on the stationary reference frame using the following Equations.

$$V_{ds}^{s*} = V_{ds}^{r*}\cos\theta - V_{qs}^{r*}\sin\theta \quad \text{[Equation 7]}$$

$$V_{qs}^{s*} = V_{ds}^{r*}\cos\theta + V_{qs}^{r*}\sin\theta \quad \text{[Equation 8]}$$

The voltage limiter (107) limits a voltage of the coordinate converter (106) and outputs the voltage, so that a voltage command can exist within the inscribed circle of the voltage limit condition expressed by a hexagon on the stationary reference frame, and the inverter unit (108) synthesize a voltage of the following Equations from the voltage limiter (107) and supplies the voltage to the IPMSM (102).

$$V_{as} = V_{ds}^{s} \quad \text{[Equation 9]}$$

$$V_{bs} = -\frac{1}{2}V_{ds}^{s} + \frac{\sqrt{3}}{2}V_{qs}^{s} \quad \text{[Equation 10]}$$

$$V_{cs} = -\frac{1}{2}V_{ds}^{s} + \frac{\sqrt{3}}{2}V_{qs}^{s} \quad \text{[Equation 11]}$$

Current sensors (109a-109c) measure a phase current between the inverter unit (108) and the IPMSM (102). The coordinate converter (110) converts the phase current to a current on the synchronous reference frame using the following Equations and provides the current to the current limiter (105) as a feedback.

$$i_{ds}^{s} = \frac{2i_{as} - i_{bs} - i_{cs}}{3} \quad \text{[Equation 12]}$$

$$i_{qs}^{s} = \frac{i_{bs} - i_{cs}}{2} \quad \text{[Equation 13]}$$

$$i_{ds}^{r} = i_{ds}^{s}\cos\theta + i_{qs}^{s}\sin\theta \quad \text{[Equation 14]}$$

$$i_{qs}^{r} = -i_{ds}^{s}\sin\theta + i_{qs}^{s}\cos\theta \quad \text{[Equation 15]}$$

However, there is a problem in that performance of the IPMSM driving system of FIG. 1 deteriorates, because the current command generator (104) uses a pre-measured (off-line) look-up table to cause subject parameters of the IPMSM to change.

Furthermore, there is another problem in that, even if the subject parameters of the IPMSM are not changed, the driving performance of motor is determined by performance of the look-up table, because the look-up table determines the performance of an entire driving region.

There is still another problem in that a voltage utilization rate of the inverter decreases to thereby decrease the output torque, because amount of voltage synthesized by the inverter is limited by the inscribed circle of the voltage limit hexagon.

It is, therefore, desirable to overcome the above problems and others by providing an improved apparatus for operating the interior permanent magnet synchronous motor.

SUMMARY OF THE DISCLOSURE

This section provides a general summary of the disclosure, and is not a comprehensive disclosure of its full scope or all of its features.

The present disclosure has been made to solve the foregoing problem(s) of the prior art, and therefore an object of certain embodiments of the present invention is to provide an apparatus for operating interior permanent magnet synchronous motor robust in parameter change by reducing dependency on look-up table during a high speed driving of an IPMSM, increasing a voltage utilization rate of an inverter, tracking a command torque to a maximum and generating a current command following the command torque to the maximum.

In one general aspect of the present disclosure, there is provided an apparatus for operating interior permanent magnet synchronous motor by receiving a command torque to drive an IPMSM in a system including a detector measuring a position and a speed of a rotor of the IPMSM, the apparatus comprising: an output unit generating and outputting a current command driving a MTPA (Maximum Torque Per Ampere) based on the command torque; a correction unit correcting the current command outputted by the output unit; a feedback unit transmitting over-modulated voltage information to the correction unit; a control unit controlling the current command to output a voltage; a first limit unit limiting an output of the control unit using a maximum voltage synthesizable by an inverter unit; and the inverter unit applying a 3-phase voltage command for tracking a command torque to the IPMSM using an output of the first limit unit.

Preferably, but not necessarily, the apparatus further comprises a first conversion unit converting an output of the control unit on synchronous reference frame to a voltage on stationary reference frame using position information of the rotor received from the detector and outputting the converted output to the first limit unit.

Preferably, but not necessarily, the apparatus further comprises current sensors measuring a phase current outputted from the inverter unit to the IPMSM.

Preferably, but not necessarily, the apparatus further comprises a second conversion unit converting a phase current on stationary reference frame received from the current sensors to a current on the synchronous reference frame and providing the converted current to the correction unit and the control unit.

Preferably, but not necessarily, the output unit comprises a second limit unit limiting a size of the torque command to a predetermined maximum range and a predetermined minimum range; a first calculation unit calculating a normalized command torque by dividing an output of the second limit unit by a normalized torque; a 1-D look-up table unit outputting a normalized current command by using the normalized command torque; and a second calculation unit outputting a current command driving a MTPA (Maximum Torque Per Ampere) by multiplying the normalized current command by the normalized current.

Preferably, but not necessarily, the 1-D look-up table unit pre-determines and stores the normalized current command relative to the normalized command torque.

Preferably, but not necessarily, the 1-D look-up table unit outputs normalized d and q axes current commands on the synchronous reference frame.

Preferably, but not necessarily, the feedback unit feedbacks the output of the control unit and the over-modulated voltage synthesized by the inverter unit to the correction unit.

Preferably, but not necessarily, the feedback unit integrates and high-pass filters the size of the over-modulated voltage, and transmits the integrated and high-pass filtered voltage to the correction unit.

Preferably, but not necessarily, the first limit unit limits an output of the control unit by using a voltage limit hexagon.

Preferably, but not necessarily, the correction unit comprises a processing unit correcting a current command driving the MTPA (Maximum Torque Per Ampere) by using a unit vector maintaining a constant torque, and a third limit unit limiting the size of the current from the current command corrected by the processing unit.

Preferably, but not necessarily, the third limit unit limits the corrected current command to a current range outputtable by the inverter.

Preferably, but not necessarily, the third limit unit provides a priority to a d-axis current on the synchronous reference frame relative to the corrected current command, outputs the d-axis current on the priority within a size of a rated current, and selects as permissible range of a q-axis current command a balance where the size of the d-axis current is subtracted from the rated current.

The apparatus for operating interior permanent magnet synchronous motor according to the present disclosure has an advantageous effect in that a difference between two voltages is minimized using a difference between an output voltage of a current control unit and a voltage actually synthesized by an inverter unit and dispensing with a prior-prepared look-up table, all the voltage limit hexagons are used to increase a DC-link voltage utilization rate of the inverter unit relative to size of the voltage synthesized by the inverter unit, and a current command is corrected to a direction holding a torque at a predetermined level, whereby a maximum torque can be followed even when an IPMSM is driven at a high speed.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present disclosure will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

Meanwhile, the terminology used herein is for the purpose of describing particular implementations only and is not intended to be limiting of the present disclosure. The terms "first," "second," and the like, herein do not denote any order, quantity, or importance, but rather are used to distinguish one element from another. For example, a second constituent element may be denoted as a first constituent element without departing from the scope and spirit of the present disclosure, and similarly, a first constituent element may be denoted as a second constituent element.

As used herein, the terms "a" and "an" herein do not denote a limitation of quantity, but rather denote the presence of at least one of the referenced item. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted. As may be used herein, the terms "substantially" and "approximately" provide an industry-accepted tolerance for its corresponding term and/or relativity between items.

Hereinafter, an apparatus for operating an IPMSM according to the present disclosure will be described in detail with reference to the accompanying drawings.

Figure 3:
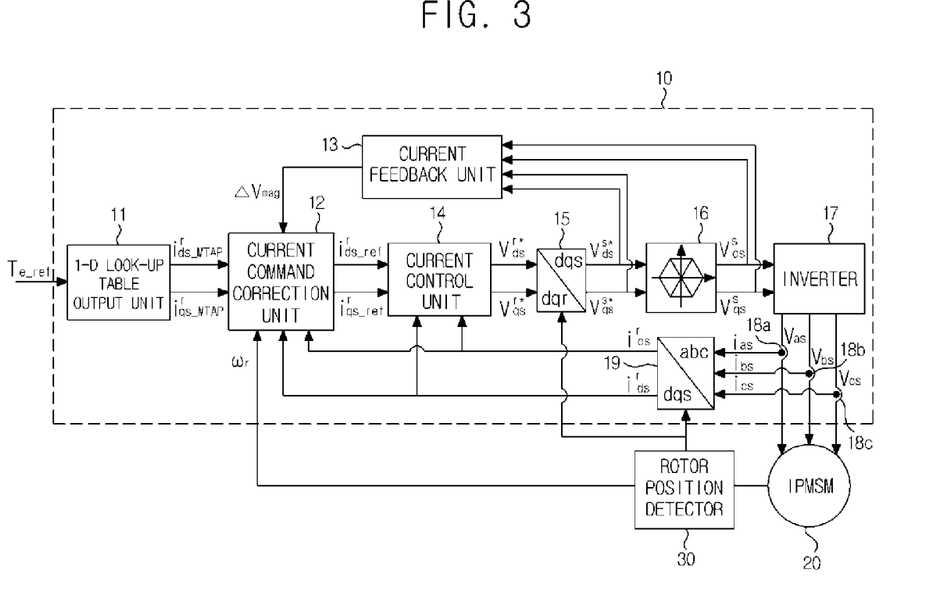
FIG. 3 is a schematic block diagram illustrating an apparatus for operating IPMSM according to an exemplary embodiment of the present disclosure.

FIG. 3 is a schematic block diagram illustrating an apparatus for operating IPMSM according to an exemplary embodiment of the present disclosure, wherein the driving of the IPMSM controlled by an inverter performing a vector control is explained.

Referring to FIG. 3, an apparatus for operating an IPMSM includes an inverter (10) including a 1-D look-up table output unit (11), a current command correction unit (12), a voltage feedback unit (13), a current controller (14), a first coordinate converter (15), a voltage limiter (16), an inverter unit (17), current sensors (18), and a second coordinate converter (19), and a rotor position detector (30).

The inverter (10) receives a current command, and outputs voltages (Vas, Vbs, Vcs) with which an IPSMS (20) can be driven by a command torque.

A rotor of the IPMSM (20) is provided with a rotor position detector (30) to calculate or measure a rotor position and a rotor speed. The rotor position measured by the rotor position detector (30) is used for coordinate conversion of the first coordinate converter (15) and the second coordinate converter (19), where the rotor speed is inputted into the current command correction unit (12).

The first look-up table output unit (11) generates and outputs the d and q axes current commands on the synchronous reference frame driving the MTPA (Maximum Torque Per Ampere) from a command torque. The first look-up table output unit (11) generates a current command on the synchronous reference frame outputting the MTPA relative to the command torque only, details of which will be described later. The current command correction unit (12) corrects a current command to allow the IPMSM (20) from the current command enabling the MTPA outputted from the 1-D look-up table output unit (11) to stably operate at a high speed.

The voltage feedback unit (13) serves to calculate a feedback voltage used by the current command correction unit (12). The voltage feedback unit (13) functions to transmit over-modulated voltage information to obtain a difference of output voltage between the first coordinate converter (15) and the voltage limiter (16).

The current controller (14) serves to control a current command, which is an output of the current command correction unit (12), and to output d and q-axes voltages on synchronous reference frame. The current controller (14) is a proportional integral (PI) controller but is not limited thereto.

The first coordinate converter (15) uses the rotor position information obtained by the rotor position detector (30) to convert the output voltage of the current controller (14) to a voltage on a stationary reference frame. The voltage limiter (16) uses a voltage limit hexagon to limit the output voltage of the first coordinate converter (15) to a voltage synthesizable by the inverter unit (17).

The voltage limit hexagon used by the voltage limiter (16) is a maximum voltage synthesizable by the inverter unit (17), whereby a voltage utilization rate of the inverter unit (17) may be maximized by the voltage limit hexagon.

In a case the output voltage of the first coordinate converter (15) is situated outside of the voltage limit hexagon of the voltage limiter (16), the voltage synthesized by the inverter unit (17) exists on a hexagon of the voltage limiter (16), with the voltage of the voltage coordinate converter (15) not being outputted.

The inverter unit (17) is a voltage type inverter including a power semiconductors such as an IGBT (insulated gate bipolar mode transistor) or a power MOSFET (metal oxide silicon field effect transistor), and applies the voltage commands (Vas, Vbs, Vcs) for tracking the current command to the IPMSM (20).

The current sensors (18a-18c) measure a phase current between the IPMSM (20) and the inverter unit (17). The current measured by the current sensors (18a to 18c) is returned to the current controller (14) and the current command correction unit (12) as a feedback in response to the coordinate conversion of the second coordinate converter (19). The second coordinate converter (19) serves to convert the phase current on the stationary reference frame measured by the current sensors (18a-18c) to that on the synchronous reference frame.

A difference between the conventional driving system of FIG. 1 and the operating apparatus of FIG. 3 may be summarized in two words. That is, a current command correction which is an input of the current controllers (105 and 14), and a final output voltage synthesis applied to the inverter units (108 and 17).

In the conventional system of FIG. 1, a command current of the current controller (105) is obtained from a torque command of a current command generator (104), the DC-link voltage of the inverter unit (108) and at least two or more 2-D look-up tables based on rotor speed, whereas the controller (14) calculates the command current using the two 1-D look-up tables of the 1-D look-up table output unit (11) and an output of the current command correction unit (12) in the operating apparatus of the present invention.

Furthermore, in case of final output voltage applied to the inverter units (108 and 17) in the conventional system, the final output voltage is controlled by an inscribed circle of the voltage limit hexagon, whereas the voltage limit hexagon is used to limit the final output voltage in the present invention. Thus, the size of the voltage synthesized by the operating apparatus of the present invention becomes relatively greater than that of the conventional system of FIG. 1 to increase the voltage utilization rate of the inverter and to increase the output torque as well.

Now, operation of the operating apparatus of the present invention thus configured will be described.

The first look-up table output unit (11) synthesizes the d and q-axes current commands on the synchronous reference frame outputting the MTPA from the torque command. The current command generating the MTPA may be obtained by pre-measuring the characteristic of IPMSM (20), and also obtainable by the following Equation: The Equation relative to the torque of the IPMSM (20) is as below:

$$T_e = \frac{3}{2}\frac{P}{2}[(L_{ds} - L_{qs})i_{ds}^r + \lambda_f]i_{qs}^r \quad \text{[Equation 16]}$$

In order to obtain the d and q-axes current commands on the synchronous reference frame outputting the MTPA from the above Equation 16, torque and current can be normalized in the following manners.

$$T_{en} = \frac{T_e}{T_{eb}} \quad \text{[Equation 17]}$$

$$i_{dn} = \frac{i_{ds}^r}{i_b} \quad \text{[Equation 18]}$$

$$i_{qn} = \frac{i_{qs}^r}{i_b} \quad \text{[Equation 19]}$$

$$T_{eb} = \frac{3}{2}\frac{P}{2}\lambda_f i_b \quad \text{[Equation 20]}$$

$$i_b = \frac{\lambda_f}{L_{qs} - L_{ds}} \quad \text{[Equation 21]}$$

$$T_{en} = i_{qn} - i_{qn}i_{dn} \quad \text{[Equation 22]}$$

$$i_{sn}^2 = (i_{dn})^2 + (i_{qn})^2 \quad \text{[Equation 23]}$$

The normalized d and q-axes current commands may be obtained from the above Equations 22 and 23, and by using same, d and q-axes current commands on the synchronous reference frame generating the MTPA may be obtained.

$$T_{en} = \sqrt{i_{dn}(i_{dn} - 1)^3} \quad \text{[Equation 24]}$$

$$T_{en} = \frac{i_{qn}}{2}\left(1 + \sqrt{1 + 4i_{qn}^2}\right) \quad \text{[Equation 25]}$$

Figure 4:
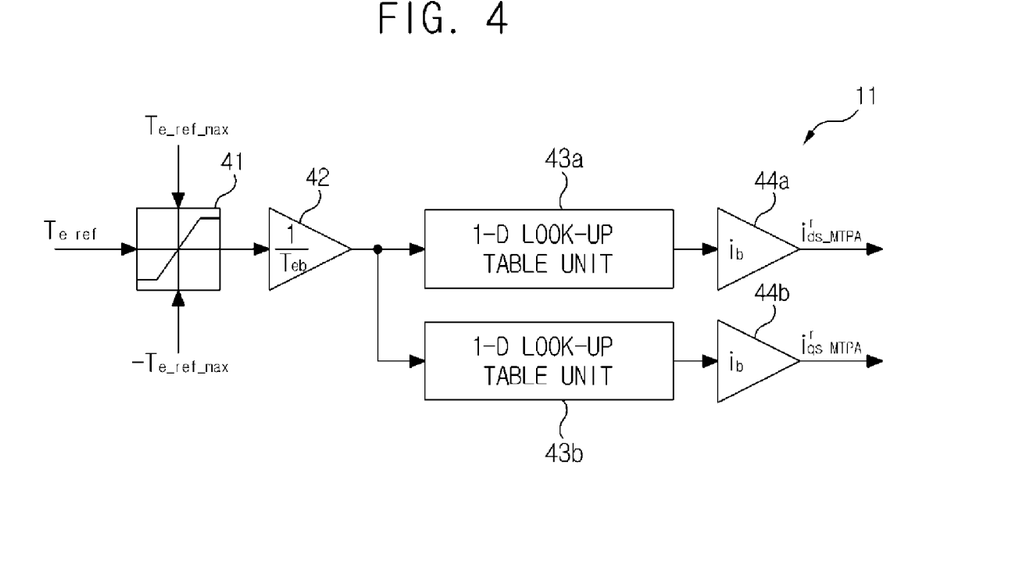
FIG. 4 is a detailed block diagram illustrating a 1-D look-up table output unit of FIG. 3 according to an exemplary embodiment of the present disclosure.

FIG. 4 is a detailed block diagram illustrating a 1-D look-up table output unit of FIG. 3 according to an exemplary embodiment of the present disclosure.

Referring to FIG. 4, the 1-D look-up table output unit (11) according to the present disclosure includes a first limit unit (41), a first calculation unit (42), 1-D look-up table units (43a and 43b) and second calculation units (44a and 44b).

The first limit unit (41) limits a size of inputted command torque to within a predetermined maximum value and a predetermined minimum value.

The first calculation unit (42) serves to divide an output of the first limit unit (41) to the normalized torque as shown in Equation 17. The 1-D look-up table units (43a and 43b) use Equations 24 and 25 to store a pre-calculated 1-D look-up table.

That is, in view of the fact that the Equations 24 and 25 are quartic equations, if $T_{en}$ is given, four $i_{dn}$ and $i_{qn}$ are respectively determined and only one is used. That is, the 1-D look-up table units (43a and 43b) pre-store one solution of the Equations 24 and 25. The second calculation units (44a and 44b) use the Equations 18 and 19 to multiply the outputs ($i_{dn}$ and $i_{qn}$) of the 1-D look-up table units (43a and 43b) by the normalized current obtained from the Equation 21 and to obtain the d and q-axes current commands ($i_{ds}^r$ and $i_{qs}^r$) driving the MTPA on the synchronous reference frame.

The voltage feedback unit of FIG. 3 feedbacks the output of the current control unit (14) and the over-modulated voltage actually synthesized by the inverter unit (17) and outputs to the current command correction unit (12), where a feedback voltage may be obtained by the following processes.

First, size of the over-modulated voltage is obtained from Equation 26. At this time, size of voltage synthesized by the inverter unit (17) is limited to the voltage limit hexagon.

$$\Delta V_{mag} = \sqrt{(V_{ds}^{s*} - V_{ds}^s)^2 + (V_{qs}^{s*} - V_{qa}^s)^2} = \sqrt{(V_{ds}^{r*} - V_{ds}^r)^2 + (V_{qs}^{r*} - V_{qs}^r)^3} \quad \text{[Equation 26]}$$

At this time the Equation 26 has the following relationship.

$$V_{ds}^{s*} = V_{ds}^{r*}\cos\theta - V_{qs}^{r*}\sin\theta \quad \text{[Equation 27]}$$

$$V_{qs}^{s*} = V_{ds}^{r*}\sin\theta + V_{qs}^{r*}\cos\theta \quad \text{[Equation 28]}$$

$$V_{ds}{}^s = V_{ds}{}^r \cos\theta - V_{qs}{}^r \sin\theta \qquad \text{[Equation 29]}$$

$$V_{qs}{}^s = V_{ds}{}^r \sin\theta + V_{qs}{}^r \cos\theta \qquad \text{[Equation 30]}$$

The voltage used by the current command correction unit (12) of FIG. 3 may be obtained as follows by integrating the Equation 26 and using a high-pass filter.

$$\Delta V_{mod} = \frac{1}{s + \omega_c} \Delta V_{mag} \qquad \text{[Equation 31]}$$

Figure 5:
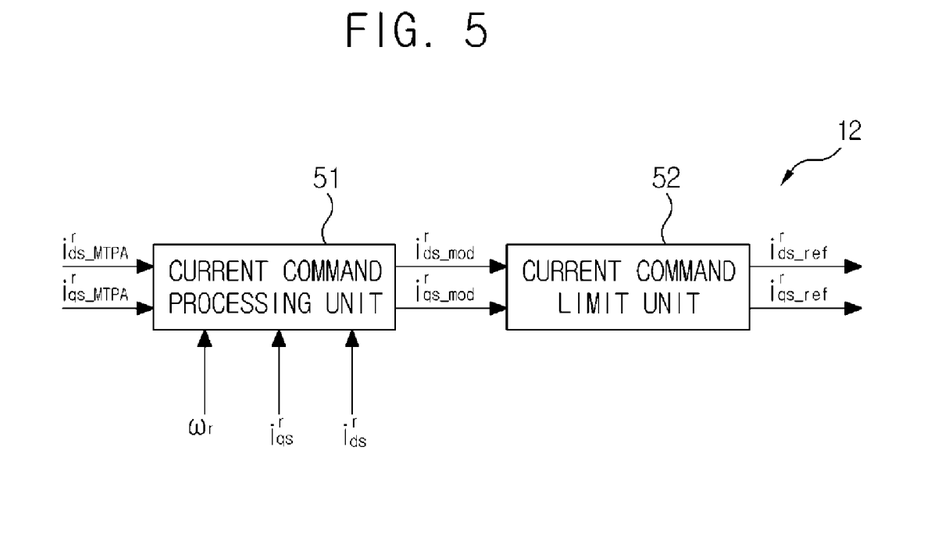
FIG. 5 is a detailed constructional view illustrating a current command correction unit of FIG. 3 according to an exemplary embodiment of the present disclosure.

FIG. 5 is a detailed constructional view illustrating a current command correction unit of FIG. 3 according to an exemplary embodiment of the present disclosure.

Referring to FIG. 5, the current command correction unit (12) includes a current command processing unit (51) and a current command limit unit (52).

The current command correction unit (12) serves to correct a current command from a current command generated from the MTPA, and the current command limit unit (52) limits the size of current corrected from the corrected current command.

The current command correction proposed by the present disclosure is to maximally track the command torque. A current vector maintaining a constant torque from the constant torque equation of Equation 16 may be obtained by the following equation.

$$\left( -\frac{\partial T_e}{\partial i_{qs}^r}, \frac{\partial T_e}{\partial i_{ds}^r} \right) = \frac{3}{2} \frac{P}{2} (-(L_{ds} - L_{qs})i_{ds}^r - \lambda_f, \ (L_{ds} - L_{qs})i_{qs}^r) \qquad \text{[Equation 32]}$$

A unit vector maintaining the constant torque from the above Equation 32 is as below:

$$(X_{norm}, Y_{norm}) = \frac{1}{\sqrt{[(L_{ds} - L_{qs})i_{ds}^r + \lambda_f]^2 + [(L_{ds} - L_{qs})i_{qs}^r]^2}}$$
$$[-(L_{ds} - L_{qs})i_{ds}^r - \lambda_f, \ (L_{ds} - L_{qs})i_{qs}^r] \qquad \text{[Equation 33]}$$

The unit vector maintaining the constant torque in the above Equation 33 and the size of voltage obtained by the Equation 26 are used by the current command correction unit of FIG. 3, and a new current command may be obtained from the current command generating the MTPA in the following manner.

$$i_{ds-mod}^r = i_{ds\_MTPA}^r + \frac{\alpha_1}{s + \omega_c} \Delta V_{mag} X_{norm} \qquad \text{[Equation 34]}$$

$$i_{qs-mod}^r = i_{qs\_MTPA}^r + \frac{\alpha_2}{s + \omega_c} \Delta V_{mag} Y_{norm} \qquad \text{[Equation 35]}$$

where, α1 and α2 represent variable gains, and may be set up to be in proportion to the speed and torque as under:

$$\alpha_1 = \alpha_{mod_1} \frac{\omega_{rpm}}{\omega_{rpm,max}} \frac{T_{e\_ref}}{T_{e,max}} \qquad \text{[Equation 36]}$$

$$\alpha_2 = \alpha_{mod_2} \frac{\omega_{rpm}}{\omega_{rpm,max}} \frac{T_{e\_ref}}{T_{e,max}} \qquad \text{[Equation 37]}$$

where, $\alpha_{mod1}$ and $\alpha_{mod2}$ are arbitrary proportional gains, $\omega_{rpm}$ is a current rotor speed, $\omega_{rpm,max}$ is maximum rotor speed, $T_{e\_ref}$ is a torque command and $T_{e,max}$ is a maximally allowable torque command, which may be further explained with reference to the drawing.

Figure 6:
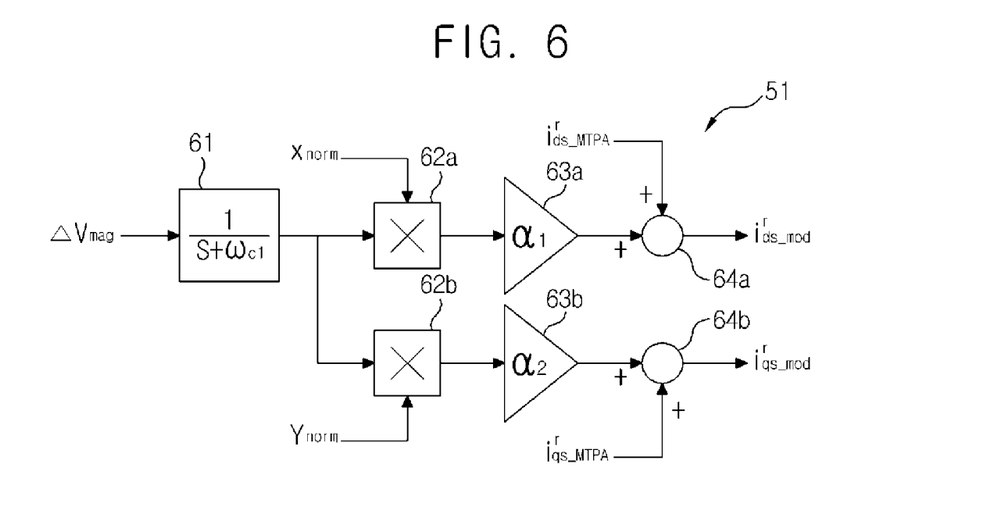
FIG. 6 is a detailed constructional view illustrating a current command processing unit of FIG. 5 according to an exemplary embodiment of the present disclosure.

FIG. 6 is a detailed constructional view illustrating a current command processing unit of FIG. 5 according to an exemplary embodiment of the present disclosure.

Referring to FIG. 6, a current command processing unit (51) includes a third calculation unit (61), fourth calculation units (62a and 62b), fifth calculation units (63a and 63b) and sixth calculation units (64a and 64b).

The third calculation unit (61) performs a calculation of Equation 3, and the fourth calculation units (62a and 62b) multiplies the unit vector maintaining the constant torque obtained by the Equation 33 by an output of the third calculation unit (61).

The fifth calculation units (63a and 63b) multiplies variable gains of Equations 34 and 35 by outputs of the fourth calculation unit (62a and 62b), and the sixth calculation units (64a and 64b) correct the current command generating the MTPA, which is outputs of the second calculation units (44a and 44b) of FIG. 4 as in Equations 34 and 35.

Now, explanation on the current command limit unit (52) of FIG. 5 will be provided.

The current command corrected by the current command processing unit (51) must exist within a current range outputtable by the inverter unit (17) as shown in FIG. 4.

At this time, the limit of current command provides a priority to a d-axis current and outputs the d-axis current on the synchronous reference frame corrected by the d-axis current on priority within a size of a rated current, wherein the q-axis current command is selected in a permissible range where the size of the d-axis current is subtracted from the rated current.

Figure 7:
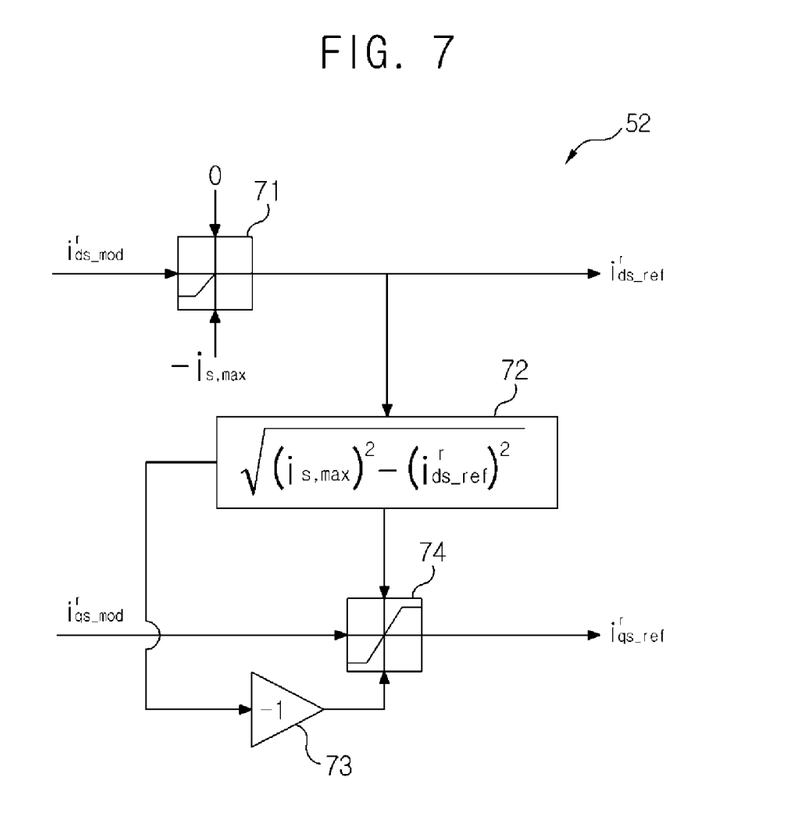
FIG. 7 is a detailed constructional view illustrating a current command limiter of FIG. 5 according to an exemplary embodiment of the present disclosure.

FIG. 7 is a detailed constructional view illustrating a current command limiter of FIG. 5 according to an exemplary embodiment of the present disclosure.

Referring to FIG. 7, the current command limit unit (52) according to the present disclosure includes a second limit unit (71), a seventh calculation unit (72), an eighth calculation unit (73) and a third limit unit (74).

The second limit unit (71) limits in such a manner that the d-axis current outputted by the fourth calculation unit (64a) of FIG. 6 exists within a permissible current range. The seventh calculation unit (72) calculates a positive maximum permissible q-axis current range from the d-axis current outputted by the second limit unit (71) and the permissible current range.

The eighth calculation unit (73) calculates a negative maximum permissible q-axis current range, and the third limit unit (74) limits the size of q-axis current calculated by the seventh and eighth calculation units (72 and 73).

As apparent from the foregoing, the apparatus for operating interior permanent magnet synchronous motor according to the present disclosure has an industrial applicability in that a difference between two voltages is minimized using a difference between an output voltage of a current controller (14) and a voltage actually synthesized by an inverter unit (17), and dispensing with a pre-prepared look-up table, all the voltage limit hexagons are used to increase a DC-link voltage utilization rate of the inverter unit (17) relative to size of the voltage synthesized by the inverter unit, and a current command is corrected to a direction holding a torque at a predetermined level, whereby a maximum torque can be tracked even when an IPMSM is driven at a high speed.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for operating interior permanent magnet synchronous motor by receiving a command torque to drive an IPMSM in a system including a detector measuring a position and a speed of a rotor of the IPMSM, the apparatus comprising:

an output unit generating and outputting a current command driving a MTPA (Maximum Torque Per Ampere) based on the command torque; a correction unit correcting the current command outputted by the output unit; a feedback unit transmitting over-modulated voltage information to the correction unit; a control unit controlling the current command to output a voltage; a first limit unit limiting an output of the control unit using a maximum voltage synthesizable by an inverter unit; and the inverter unit applying a 3-phase voltage command for tracking a command torque to the IPMSM using an output of the first limit unit;

wherein the output unit comprises a second limit unit limiting a size of the torque command to a predetermined maximum range and a predetermined minimum range; a first calculation unit calculating a normalized command torque by dividing an output of the second limit unit by a normalized torque; a 1-D look-up table unit outputting a normalized current command by using the normalized command torque; and a second calculation unit outputting a current command driving a MTPA (Maximum Torque Per Ampere) by multiplying the normalized current command by the normalized current;

wherein the correction unit comprises a processing unit correcting a current command driving the MTPA (Maximum Torque Per Ampere) by using a unit vector maintaining a constant torque, and a third limit unit limiting the size of the current from the current command corrected by the processing unit;

wherein the third limit unit provides a priority to a d-axis current on the synchronous reference frame relative to the corrected current command, outputs the d-axis current on the priority within a size of a rated current, and selects as permissible range of a q-axis current command a balance where the size of the d-axis current is subtracted from the rated current.

2. The apparatus of claim 1, further comprising a first conversion unit converting an output of the control unit on synchronous reference frame to a voltage on stationary reference frame using position information of the rotor received from the detector and outputting the converted output to the first limit unit.

3. The apparatus of claim 1, further comprising current sensors measuring a phase current outputted from the inverter unit to the IPMSM.

4. The apparatus of claim 3, further comprising a second conversion unit converting a phase current on stationary reference frame received from the current sensors to a current on the synchronous reference frame and providing the converted current to the correction unit and the control unit.

5. The apparatus of claim 1, wherein the 1-D look-up table unit pre-determines and stores the normalized current command relative to the normalized command torque.

6. The apparatus of claim 1, wherein the 1-D look-up table unit outputs normalized d and q axes current commands on the synchronous reference frame.

7. The apparatus of claim 1, wherein the feedback unit feedbacks the output of the control unit and the over-modulated voltage synthesized by the inverter unit to the correction unit.

8. The apparatus of claim 7, wherein the feedback unit integrates and high-pass filters the size of the over-modulated voltage, and transmits the integrated and high-pass filtered voltage to the correction unit.

9. The apparatus of claim 1, wherein the first limit unit limits an output of the control unit by using a voltage limit hexagon.

10. The apparatus of claim 1, wherein the third limit unit limits the corrected current command to a current range outputtable by the inverter unit.

* * * * *